(12) United States Patent
Van Rassell et al.

(10) Patent No.: US 9,716,854 B2
(45) Date of Patent: *Jul. 25, 2017

(54) VIDEO MULTIVIEWER SYSTEM WITH DISTRIBUTED SCALING AND RELATED METHODS

(75) Inventors: William F. Van Rassell, Richmond Hill (CA); Daniel Mance, Burlington (CA); Chad Faragher, Kitchener (CA)

(73) Assignee: Imagine Communications Corp., Frisco, TX (US)

( * ) Notice: Subject to any disclaimer, the term of this patent is extended or adjusted under 35 U.S.C. 154(b) by 1111 days.

This patent is subject to a terminal disclaimer.

(21) Appl. No.: 12/100,121

(22) Filed: Apr. 9, 2008

(65) Prior Publication Data

US 2009/0256862 A1    Oct. 15, 2009

(51) Int. Cl.

| | |
|---|---|
| *G09G 5/14* | (2006.01) |
| *H04N 5/445* | (2011.01) |
| *H04N 21/426* | (2011.01) |
| *H04N 21/4402* | (2011.01) |
| *H04N 5/45* | (2011.01) |
| *G09G 5/36* | (2006.01) |
| *G09G 5/393* | (2006.01) |
| *H04N 21/431* | (2011.01) |
| *H04N 21/434* | (2011.01) |
| *H04N 21/443* | (2011.01) |

(52) U.S. Cl.
CPC ............... *H04N 5/45* (2013.01); *G09G 5/14* (2013.01); *G09G 5/363* (2013.01); *G09G 5/393* (2013.01); *H04N 5/44504* (2013.01); *H04N 5/44591* (2013.01); *H04N 21/42653* (2013.01); *H04N 21/4316* (2013.01); *H04N 21/4342* (2013.01); *H04N 21/4435* (2013.01); *H04N 21/440263* (2013.01); *G09G 2340/0407* (2013.01); *G09G 2340/125* (2013.01)

(58) Field of Classification Search
CPC .. H04N 5/45; H04N 5/44504; H04N 5/44591; H04N 21/42653; H04N 21/4316; H04N 21/4342; H04N 21/440263; H04N 21/4435; G09G 2340/0407; G09G 2340/125; G09G 5/393; G09G 5/363; G09G 5/14
USPC ................ 345/629, 660–661, 505–506, 520; 348/426.1, 441, 448, 581, 705, 143

See application file for complete search history.

(56) References Cited

U.S. PATENT DOCUMENTS

| | | | |
|---|---|---|---|
| 5,600,573 A | 2/1997 | Hendricks et al. ....... | 364/514 R |
| 5,619,226 A * | 4/1997 | Cahill, III .............. | H04N 9/641 |
| | | | 345/667 |
| 5,867,657 A | 2/1999 | Bolosky et al. ......... | 395/200.49 |
| 5,928,327 A | 7/1999 | Wang et al. .................. | 709/217 |

(Continued)

*Primary Examiner* — Chante Harrison
(74) *Attorney, Agent, or Firm* — Tarolli, Sundheim, Covell & Tummino LLP (57) ABSTRACT

A video multiviewer system may include a plurality of video scalers operating in parallel for generating initially scaled video streams by performing video scaling in at least one dimension on a plurality of video input streams. The video multiviewer system may also include a processing unit coupled downstream from the video scalers for generating additionally scaled video streams by performing additional video scaling on the initially scaled video streams, and a display cooperating with the processing unit for displaying multiple video windows based upon the additionally scaled video streams.

27 Claims, 11 Drawing Sheets

(56) References Cited

U.S. PATENT DOCUMENTS

| | | | | |
|---|---|---|---|---|
| 6,243,095 | B1 | 6/2001 | Shile et al. | 345/357 |
| 6,393,163 | B1 | 5/2002 | Burt et al. | 382/294 |
| 6,571,349 | B1 | 5/2003 | Mann et al. | 714/6 |
| 6,816,194 | B2 | 11/2004 | Zhang et al. | 348/240.27 |
| 7,023,488 | B2 | 4/2006 | Szybiak et al. | 348/484 |
| 7,092,621 | B1 | 8/2006 | Yoshino et al. | 386/125 |
| 7,333,114 | B2 | 2/2008 | Andrews et al. | 345/557 |
| 9,172,900 | B2* | 10/2015 | Komorowski | H04N 5/2624 |
| 2002/0158893 | A1* | 10/2002 | MacInnis | G09G 5/363 348/E9.039 |
| 2003/0043916 | A1* | 3/2003 | Zhong et al. | 375/240.24 |
| 2003/0231259 | A1 | 12/2003 | Yui et al. | 348/564 |
| 2004/0169660 | A1* | 9/2004 | MacInnis et al. | 345/601 |
| 2004/0208163 | A1* | 10/2004 | Patel et al. | 370/351 |
| 2004/0233230 | A1 | 11/2004 | Hancock | 345/690 |
| 2005/0168632 | A1* | 8/2005 | Neuman et al. | 348/448 |
| 2005/0232167 | A1 | 10/2005 | Gilbert et al. | 370/260 |
| 2005/0254440 | A1 | 11/2005 | Sorrell | 370/264 |
| 2006/0098022 | A1 | 5/2006 | Andrews et al. | 345/557 |
| 2006/0107302 | A1 | 5/2006 | Zdepski | 725/135 |
| 2006/0290708 | A1 | 12/2006 | MacInnis et al. | 345/592 |
| 2007/0024706 | A1* | 2/2007 | Brannon et al. | 348/143 |
| 2007/0044138 | A1* | 2/2007 | Yang et al. | 725/151 |
| 2007/0050336 | A1 | 3/2007 | Bugir et al. | 707/3 |
| 2007/0050366 | A1 | 3/2007 | Bugir et al. | 707/9 |
| 2007/0050382 | A1 | 3/2007 | Bugir et al. | 707/100 |
| 2007/0139425 | A1* | 6/2007 | Neuman | 345/520 |
| 2007/0268317 | A1 | 11/2007 | Banay | 345/660 |
| 2009/0027557 | A1* | 1/2009 | Berbecel | H04N 5/445 348/589 |
| 2009/0254683 | A1* | 10/2009 | Camer | G09G 5/001 710/23 |
| 2009/0256859 | A1* | 10/2009 | Komorowski et al. | 345/629 |
| 2009/0256863 | A1* | 10/2009 | Komorowski et al. | 345/660 |

\* cited by examiner

VIDEO MULTIVIEWER SYSTEM WITH DISTRIBUTED SCALING AND RELATED METHODS

FIELD OF THE INVENTION

The present invention relates to the field of viewers for video streams, and, more particularly, to multiviewers and related methods.

BACKGROUND OF THE INVENTION

As broadcasters continue the transition from analog to digital video, the television production process is increasingly conducted in an all-digital domain, that is, from the initial camera shot to the display in the consumer's living room. This move to digital technology permits broadcasters to simultaneously broadcast multiple video streams using a single connection. Indeed, for popular live events, broadcasters typically deploy mobile broadcast units to route and manipulate, i.e. producing, the numerous video streams, which come from respective cameras throughout the event, before being transmitted.

An approach to manipulating and monitoring the video streams is a multiviewer. The typical multiviewer may include a monitor and associated processor receiving the video streams. Each video stream typically comprises a high-resolution digital video stream. Accordingly, the processor may perform the computationally intensive operation of scaling the video stream to accommodate simultaneously fitting all the video streams onto a single display. Some multiviewers may use a plurality of monitors, thereby permitting the viewing of even more video streams. A potential drawback to the typical multiviewer is the difficulty in rearranging the video streams on the monitor in real time. For example, a user viewing the multiviewer monitor displaying four video streams split equally over quarters of the monitor may desire to expand a first video stream and correspondingly reduce the other video streams. This operation may cause the processor to adjust scaling operations in real time based upon requests from the user. More specifically, to provide advanced features to the user, the typical multiviewer may have to include significant hardware to provide adequate processing power, thereby possibly increasing the form factor and housing size to undesirable levels.

An approach to scaling used by multiviewers available from Evertz Microsystems Ltd. of Burlington Canada is full input scaling. Using full input scaling, the video streams are completely scaled before being compressed and combined into a transport stream for viewing by the monitor. Potential drawbacks to the full input scaling approach may include significant hardware requirements that exceed mobile packaging environments. Moreover, each desired scaled size for the video streams may use dedicated hardware. Moreover, the transport stream may have limited bandwidth and may be incapable of displaying the video streams in their native resolution without upconverting the video streams, which may impact the quality thereof.

Another approach to scaling used by certain multiviewers available from the Harris Corp. of Melbourne, Fla., the assignee of the present application, is cascading. This approach may include coupling full scaler modules in cascade, each module being responsible for scaling a video stream and superimposing the respective stream onto the transport stream, i.e. the user display. Several drawbacks to this approach may include burdensome system level control, difficult output scalability, large hardware requirements, and a failure intolerant design.

Yet another approach to scaling in multiviewers is destination scaling in hardware. In this approach, the scalers are located downstream from the routing devices, for example, cross-point switchers. Several drawbacks to this approach may include lack of modularity, inefficient hardware consumption, and large form factor for the housing, and limited input and output scaling.

Another approach to scaling in multiviewers is destination scaling in the Graphics Processing Unit (GPU). In this approach, the video streams are directly fed via a Direct Memory Access (DMA) module into the central processing unit (CPU) of a personal computer, where any needed pre-processing is performed. The video streams are then rendered onto the monitor using the GPU. Several drawbacks to this approach include support for only few video streams, limited bandwidth in the DMA module, and lack of scalability in the input and output.

Another approach to a multiviewer is disclosed in U.S. Pat. No. 7,023,488 to Szybiak et al. This multiviewer includes a circuit for detecting a transition in the content of a digital video stream containing embedded audio samples and for providing a smooth transition from an old audio stream embedded before the transition to a new audio stream embedded after the transition.

SUMMARY OF THE INVENTION

In view of the foregoing background, it is therefore an object of the present invention to provide a video multiviewer system that is more efficient, such as, in terms of scaling, to provide additional user flexibility.

This and other objects, features, and advantages in accordance with the present invention are provided by a video multiviewer system comprising a plurality of video scalers operating in parallel for generating initially scaled video streams by performing video scaling in at least one dimension on a plurality of video input streams. The multiviewer system may also include a processing unit coupled downstream from the video scalers for generating additionally scaled video streams by performing additional video scaling on the initially scaled video streams, and a display cooperating with the processing unit for displaying multiple video windows based upon the additionally scaled video streams. Advantageously, the video multiviewer system may scale the video streams more efficiently by sharing the computational workload.

More particularly, each of the video scalers may perform video scaling in only one dimension. For example, each of the video scalers may perform video scaling in at least a horizontal dimension of video frames. The processing unit may perform video scaling in at least a vertical dimension of video frames. Moreover, each of the video scalers may perform video scaling as a selectable power of 2.

In some embodiments, the processing unit may comprise a Graphics Processing Unit (GPU) including a GPU processor and GPU memory coupled thereto. Also, the video multiviewer system may further comprise at least one Direct Memory Access (DMA) engine coupled between the video scalers and the CPU. The video multiviewer system may also include a data communications bus coupled between the DMA engine and the CPU, and a central processing unit (CPU) coupled to the data communications bus. Additionally, each of the plurality of video scalers may comprise a hardware implemented video scaler.

Furthermore, the video multiviewer system may further comprise at least one video cross-point switcher coupled upstream from the video scalers. The video scalers and the processing unit may further cooperate to process data other than video stream data. The video scalers may perform bit data extraction. Also, the processing unit may perform data decoding and interpretation based upon the bit data extraction.

Another aspect is directed to a method for operating a video multiviewer system comprising a plurality of video scalers, a processing unit coupled downstream from the video scalers, and a display cooperating with the processing unit. The method may include operating the video scalers in parallel for generating initially scaled video streams by performing video scaling in at least one dimension on a plurality of video input streams, and generating with the processing unit additionally scaled video streams by performing additional video scaling on the initially scaled video streams. The method may also include displaying multiple video windows based upon the additionally scaled video streams.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Although the embodiments described herein have been directed to multiviewers in a broadcast setting, those of skill in the art will appreciate that in other embodiments the multiviewers and associated methods can be used for security, medical and other applications as well. Like numbers refer to like elements throughout, and multiple prime notation is used to indicate similar elements in alternative embodiments.

Figure 1:
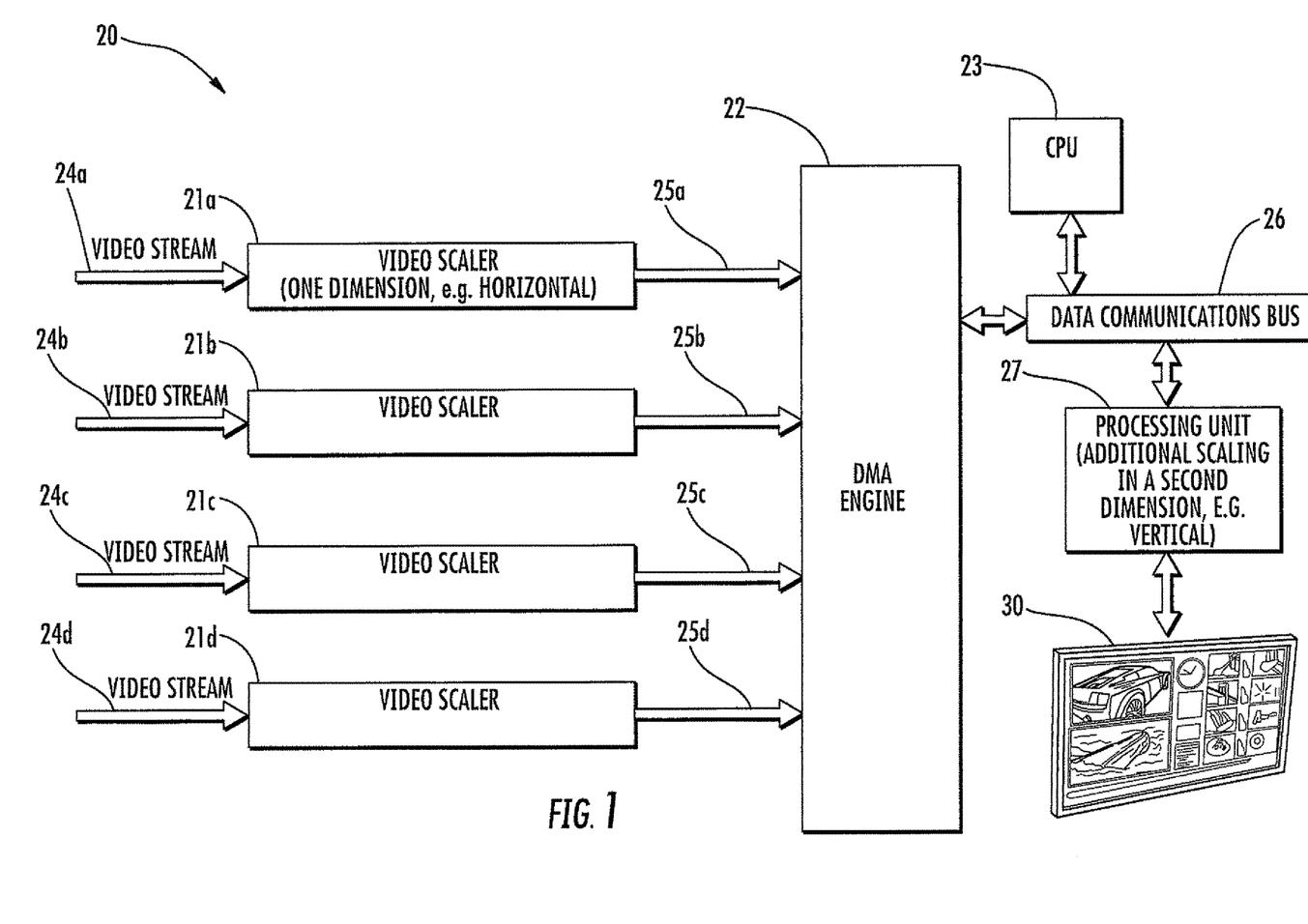
FIG. 1 is a schematic block diagram of a video multiviewer system according to the present invention.

Referring initially to FIG. 1, a video multiviewer system 20 illustratively includes a plurality of video scalers 21a-21d operating in parallel for generating initially scaled video streams 25a-25d by performing video scaling in at least one dimension on a plurality of video input streams 24a-24d. Each video input stream 24a-24d may comprise a Society of Motion Picture and Television Engineers (SMPTE) 424M 3G-Serial Digital Interface (SDI) standard, for example. Moreover, although illustrated as receiving 4 video input streams 24a-25d, the video multiviewer system 20 may alternatively receive less or more video input streams. Moreover, each video input stream 24a-24d may alternatively comprise a different SDI standard, such as, High Definition-SDI and Standard Definition-SDI. Nonetheless, the 3G-SDI standard advantageously provides robust transport bandwidth.

The multiviewer system 20 illustratively includes a processing unit 27 coupled downstream from the video scalers 21a-21d for generating additionally scaled video streams (video output streams) by performing additional video scaling on the initially scaled video streams 25a-25d, and a display 30 cooperating with the processing unit for displaying multiple video windows based upon the additionally scaled video streams. Although illustrated as a single screen display, the display 30 may comprise a plurality of screens, for example, 94 displays. Advantageously, the video multiviewer system 20 may scale the video input streams 24a-24d more efficiently by distributing the computationally intensive process of scaling the video input streams.

More particularly, each of the video scalers 21a-21d illustratively performs video scaling in only one dimension, for example, in a horizontal dimension of video frames. The processing unit 27 illustratively performs video scaling in at least a vertical dimension of video frames to complete the scaling of the video input streams 24a-24d. Advantageously, the computationally intensive vertical scaling, which may use large amounts of storage and logic resources, may be performed by the processing unit 27. As will be appreciated by those skilled in the art, other distributions of the scaling processes may be implemented. For example, the processing unit 27 may perform part of the horizontal scaling and the vertical scaling, or the video scalers 21a-21d could alternatively or in addition perform a portion of the vertical scaling, i.e. a less intensive portion of the vertical scaling. In general, less intensive scaling processes should be allocated to the video scalers 21a-21d while the more complex scaling processes should be allocated to the processing unit 27.

Additionally, each of the video scalers 21a-21d may comprise a hardware implemented video scaler. In other words, the processing power of the video scalers 21a-21d may be limited and static. Advantageously, the video multiviewer system 20 allocates the horizontal scaling processes, which use fewer resources than the vertical scaling processes, to the video scalers 21a-21d. Moreover, each of the video scalers 21a-21d may perform video scaling as a selectable power of 2, for example, 1, 2, 4, 8, and so forth, further reducing computational intensity demands on the video scalers. Advantageously, since the computational demand on the hardware implemented video scalers 21a-21d is limited, the size of the packaging and housing used for the video scalers is reduced. For example, a single field-programmable gate array (FPGA) may be used to implement the video scalers 21a-21d to prescale 8 3G-SDI video input streams.

The video scalers 21a-21d and the processing unit 27 illustratively cooperate to process data other than video stream data using distributed processing, for example, metadata extraction and audio ballistics metering. More specifically, the video scalers 21a-21d may also perform bit data extraction, thereby advantageously reducing bandwidth passed on to the processing unit 27. The processing unit 27 may perform data decoding and interpretation based upon the bit data extraction. Furthermore, to reduce the computational payload of a Central Processing Unit (CPU) 23 for audio processing, the video scalers 21a-21d may calculate raw ballistics values while the processing unit 27 cooperates to interpret the data and render appropriate audio amplitudes and phase meters.

Figure 2:
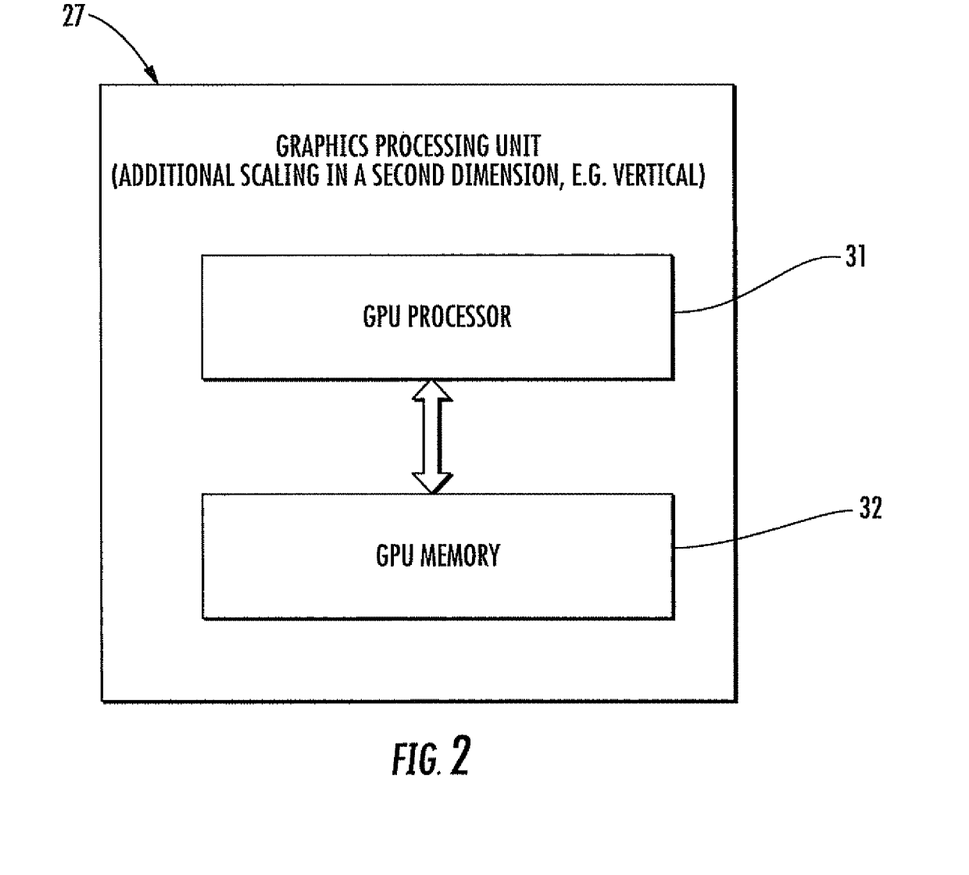
FIG. 2 is a more detailed schematic block diagram of the processing unit from FIG. 1.

Referring now additionally to FIG. 2, further details of the processing unit 27 are now described. The processing unit 27 illustratively comprises a Graphics Processing Unit (CPU) including a CPU processor 31 and GPU memory 32 coupled thereto. Although illustrated as a single GPU, the processing unit 27 may include a plurality of CPUs performing scaling in parallel. More so with the dedicated GPU memory 32, the processing unit 27 may efficiently handle the computationally and memory intensive vertical scaling tasks. The CPU processor 31 and GPU memory 32 are an illustrated embodiment of the processing unit 27, and those skilled in the art will appreciate other implementations as well.

Referring again to FIG. 1, the video multiviewer system 20 illustratively includes a Direct Memory Access (DMA) engine 22 coupled between the video scalers 21a-21d and the processing unit (GPU) 27. Also, a second FPGA, in addition to the FPGA that may implement the video scalers 21a-21d, may be used to implement the DMA engine 22.

The video multiviewer system 20 illustratively includes a data communications bus 26 coupled between the DMA engine 22 and the processing unit (GPU) 27, and the CPU 23 coupled to the data communications bus. Advantageously, after the video input streams 24a-24d are prescaled, the DMA engine 22 "DMAs" the initially scaled video streams 25a-25d into the processing unit 27 for final scaling.

As will be appreciated by those skilled in the art, the data communications bus 26 has an associated bandwidth and corresponding data throughput that may limit processing for scaling in the processing unit 27. Advantageously, in the video multiviewer system 20, since the scaling is distributed between the video scalers 21a-21d and the processing unit 27, the bandwidth bottleneck of the data communication bus 26 is less likely to be exceeded. Indeed, the distributed scaling of the video multiviewer system 20 may allow for sufficiently offloading the processing unit 27 so that it handles the remaining scaling work, and the distributed scaling sufficiently reduces the DMA engine 22 bandwidth to "DMA" up to 64 video streams over modern local bus architectures, such as, PCI Express (1st generation) and Hyper Transport.

Advantageously, since the video multiviewer system 20 consumes limited physical space, the system may be installed into a Platinum multiviewer, as available from the Harris Corporation of Melbourne, Fla. (Harris Corp.), the assignee of the present application, or a router. Additionally, the video multiviewer system 20 may control routing of the video input streams 24a-24d. More specifically, the video multiviewer system 20 may access any of the router inputs, for example, that is all 512 inputs in a 28RU Platinum router, as available from the Harris Corp.

Although illustrated with a single plurality of video scalers 21a-21d and a corresponding processing unit 27, data communications bus 26, CPU 23, and DMA engine 22 (all together hereinafter referenced as a "set"), in other embodiments, the video multiviewer system 20 may additionally include multiple sets, all of which may be installed in the 28RU Platinum router, for example.

The video multiviewer system 20 may selectively choose which set a video input stream routes to. Thereby, the video multiviewer system 20 may actively balance internal resource utilization between sets, and thus makes it possible to get better performance out of the same hardware.

Moreover, if a user of the video multiviewer system 20 chooses to display the same video input streams 24a-24d in two picture-in-pictures (PIPs) of different size, the video multiviewer system can route it to two of its inputs, and apply different pre-scaling ratios to yield the best quality picture for both PIPs.

Advantageously, the number of video input streams 24a-24d received by the video multiviewer system 20 is scalable. In particular, the number of inputs may be scalable based on the scalability of the 28RU Platinum Router. Additionally, the number of outputs can be scaled up by inserting additional "sets" into the Platinum router frame, and each set may work independently of each other while having no limiting effect on other sets in the frame.

Since all sets in a frame have access to the same inputs, a user may readily build a video multiviewer system 20 that spans a single video frame across two or more displays 30 driven by two or more sets, each set routing the same video stream to its input and displaying the corresponding portion of the video frame. This may allow for spanning a single video frame across a wall of displays.

Figure 3:
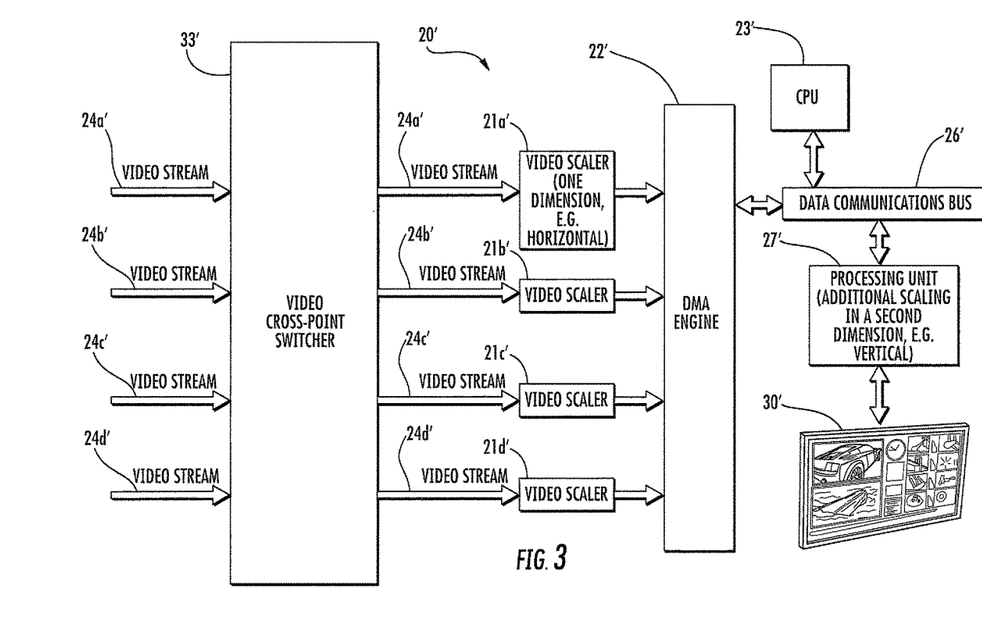
FIG. 3 is a schematic block diagram of a second embodiment of the video multiviewer system according to the present invention.

Referring now to FIG. 3, another embodiment of the video multiviewer system 20' is now described. In this embodiment of the video multiviewer system 20', those elements already discussed above with respect to FIG. 1 are given prime notation and most require no further discussion herein. This embodiment differs from the previous embodiment in that the video multiviewer system 20' illustratively includes a cross-point switcher 331 coupled upstream from the video scalers 21a'-21d'. The cross-point switcher 331 illustratively receives the video input streams 24a'-24d' and routes the same to the appropriate video scaler 21a'-21d'.

Figure 4:
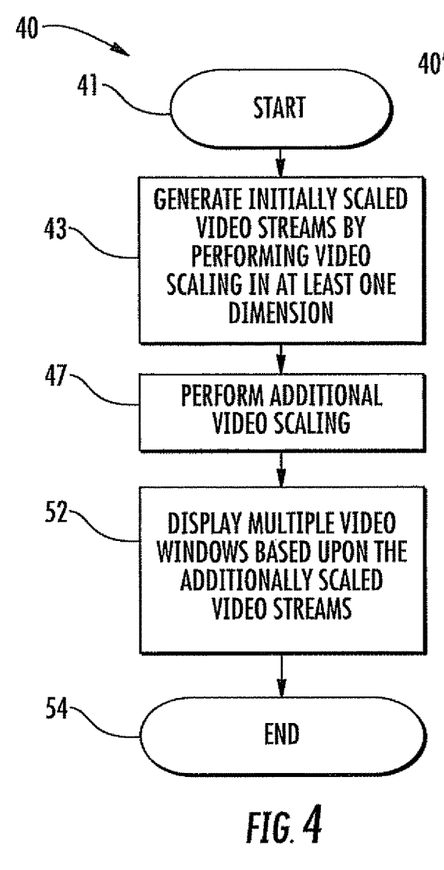
FIG. 4 is a flowchart for a method of operating a video multiviewer system according to the present invention.

Referring now additionally to FIG. 4, a flowchart 40 illustrates a method for operating a video multiviewer system 20 comprising a plurality of video scalers 21a-21d, a processing unit 27 coupled downstream from the video scalers, and a display 30 cooperating with the processing unit. The method begins at Block 41 and illustratively includes at Block 43 operating the video scalers 21a-21d in parallel for generating initially scaled video streams 25a-25d by performing video scaling in at least one dimension on a plurality of video input streams 24a-24d. The method also illustratively includes at Block 47 generating with the processing unit 27 additionally scaled video streams by performing additional video scaling on the initially scaled video streams 25a-25d. At Block 52, the method illustratively includes displaying multiple video windows based upon the additionally scaled video streams. The method ends at Block 54.

Figure 5:
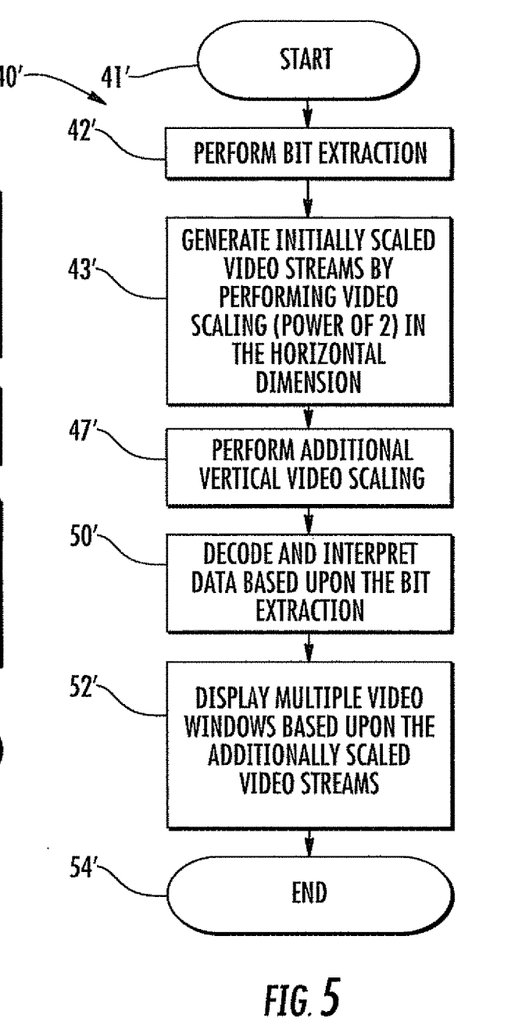
FIG. 5 is a flowchart for a second embodiment of the method of operating a video multiviewer system according to the present invention.

Referring now additionally to FIG. 5, another embodiment of the method for operating a video multiviewer system 20 is now described in flowchart 40'. In this embodiment of the method, those elements already discussed above with respect to FIG. 4 are given prime notation and most require no further discussion herein. This embodiment differs from the previous embodiment in that the method further illustratively includes at Block 42' performing bit extraction, and at Block 50' decoding and interpreting the data based upon the bit extraction. Although the bit extraction at Block 42' is illustrated upstream from the initial scaling at Block 43l, the two steps may alternatively be performed in parallel. Moreover, in this embodiment in the method, the method illustratively includes performing at least horizontal scaling, for example, scaling at a power of 2, at Block 43'. Also, the method illustratively includes performing at least vertical scaling at Block 47'.

Figure 6:
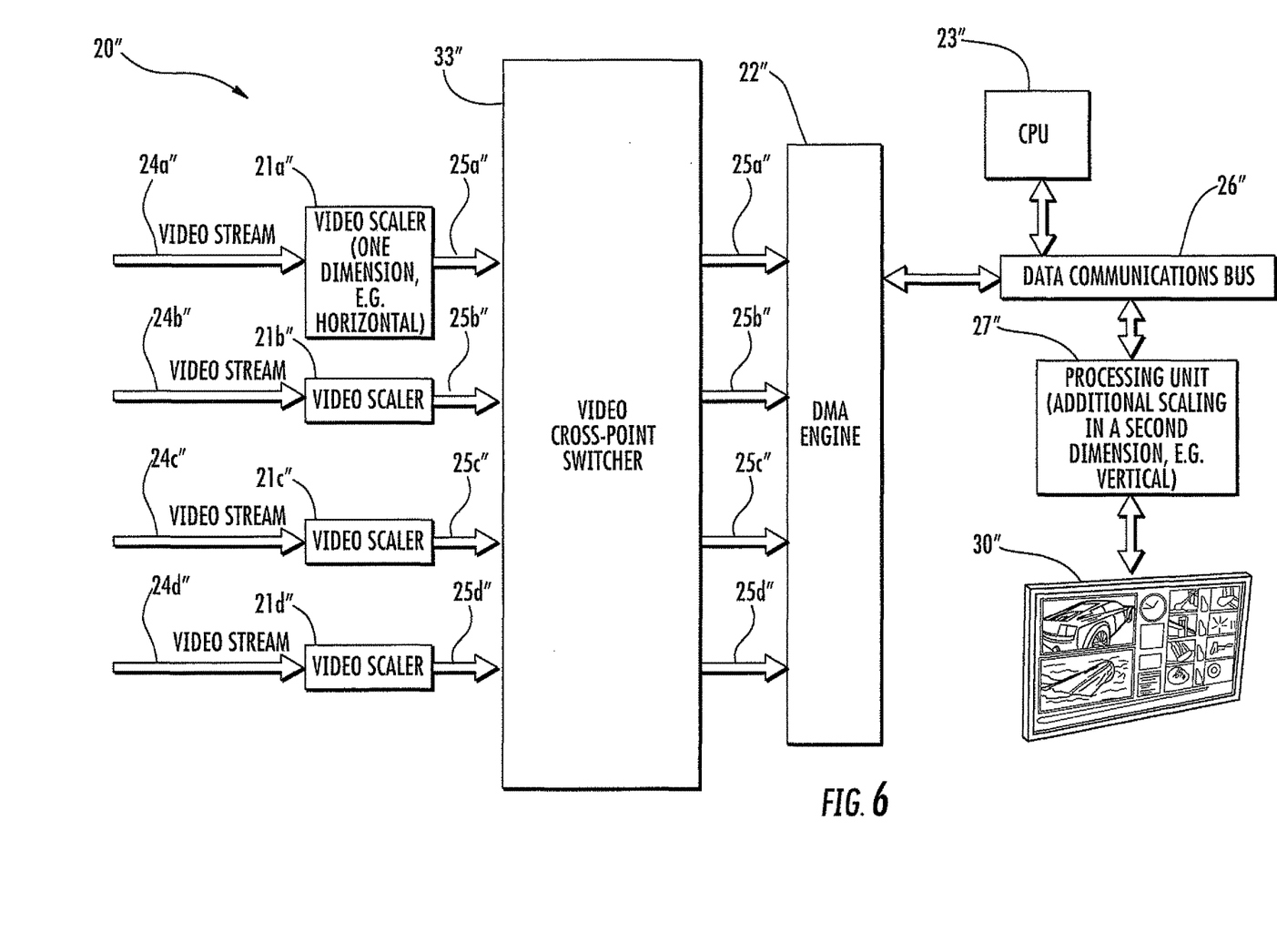
FIG. 6 is a schematic block diagram of a third embodiment of the video multiviewer system according to the present invention.

Referring now to FIG. 6, another embodiment of a video multiviewer system 20" is now described. In this embodiment of the video multiviewer system 20", those elements already discussed above with respect to FIG. 3 are given double prime notation and most require no further discussion herein. This embodiment differs from the previous embodiment in that the cross-point switcher 33" is coupled downstream from the video scalers 21a"-21d".

As will be appreciated by those skilled in the art, the initially scaled video streams 25a"-25d"f may be based upon a SDI standard, for example, the 3G-SDI standard. Advantageously, the cross-point switcher 33" may route via any standard broadcast equipment for handling 3G-SDI streams, for example, transceivers capable of transmission over large geographical distances. In other words, the video scalers 21a"-21d" may be geographically remote to the processing unit 27" and the CPU 23", further reducing form factor and size at the destination multiviewer.

The internal routing in the 28RU Platinum router frame supports 3 Gbps serial digital links to allow routing of 3G-SDI signals. Although the video multiviewer system 20" may support any 3 Gbps SDI (standard or proprietary transport streams), the video multiviewer system may maintain standard framing of a 3G-SDI stream, while using the ancillary and video data payload space for packetized transport data as will be appreciated by those skilled in the art.

Advantageously, the video multiviewer system 20" may reuse the existing Internet Protocol (IP) and logic for generating and receiving the communication link without using a proprietary standard. The video multiviewer system 20" may use the same ingest logic on the input module (22"-23", 26"-27") as for both baseband video and communications between the video scalers 21a"-21d", which may provide dynamic mapping of any input module input to support a baseband SDI.

Figure 7:
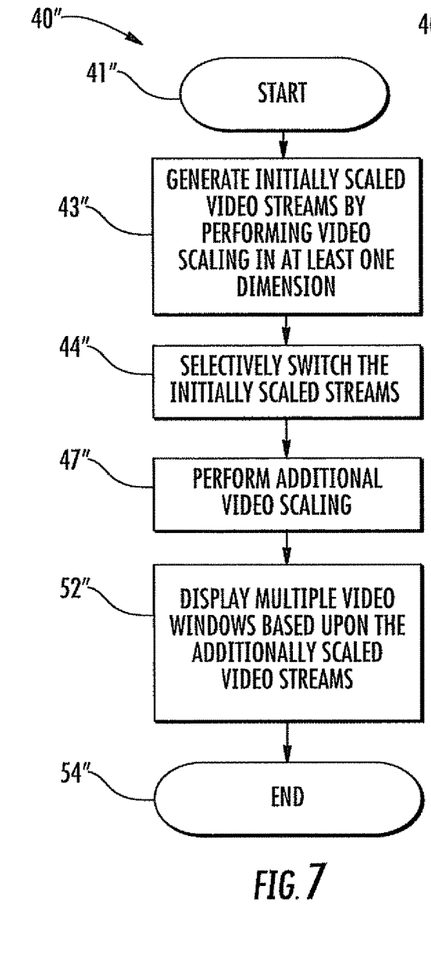
FIG. 7 is a flowchart for a third embodiment of the method of operating a video multiviewer system according to the present invention.

Referring now additionally to FIG. 7, another embodiment of the method for operating a video multiviewer system 20" is now described in the flowchart 40". In this embodiment of the method, those elements already discussed above with respect to FIG. 4 are given double prime notation and most require no further discussion herein. This embodiment differs from the previous embodiment in that the method further illustratively includes at Block 44" selectively switching the initially scaled video streams 25a"-25d" to the processing unit 27".

Figure 8:
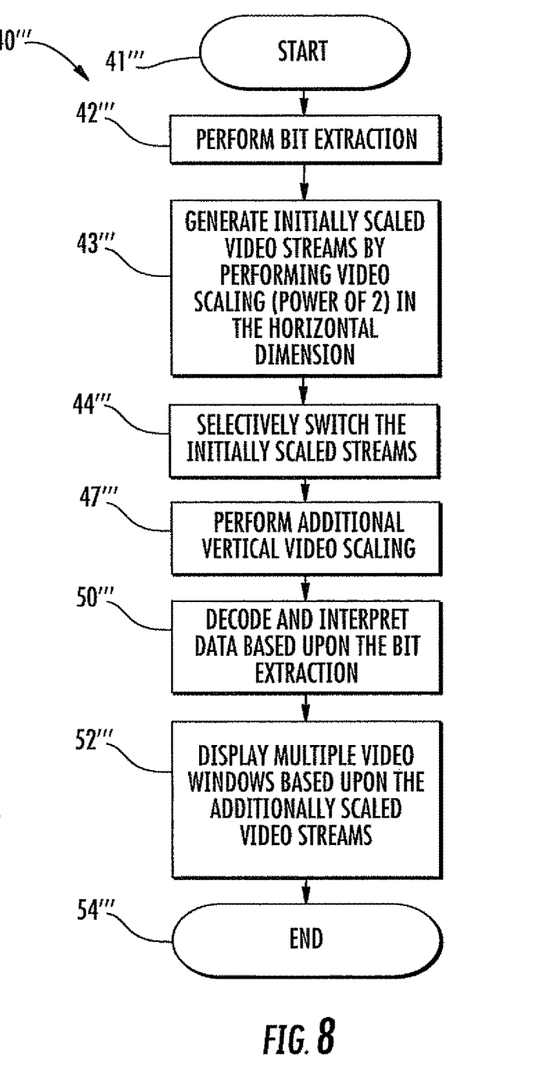
FIG. 8 is a flowchart for a fourth embodiment of the method of operating a video multiviewer system according to the present invention.

Referring now additionally to FIG. 8, another embodiment of the method for operating a video multiviewer system 20" is now described in the flowchart 40". In this embodiment of the method, those elements already discussed above with respect to FIG. 7 are given triple prime notation and most require no further discussion herein. This embodiment differs from the previous embodiment in that the method further illustratively includes at Block 42''' performing bit extraction, and at Block 50''' decoding and interpreting the data based upon the bit extraction. Although the bit extraction at Block 42''' is illustrated upstream from the initial scaling at Block 43''', the two steps may alternatively be performed in parallel. Additionally, although the additional scaling at Block 47''' is illustrated upstream from the decoding at Block 50''', the two steps may alternatively be performed in parallel. Moreover, in this embodiment, the method illustratively includes performing at least horizontal scaling, for example, scaling at a power of 2, at Block 43'''. Also, the method illustratively includes performing at least vertical scaling at Block 47'''.

Figure 9:
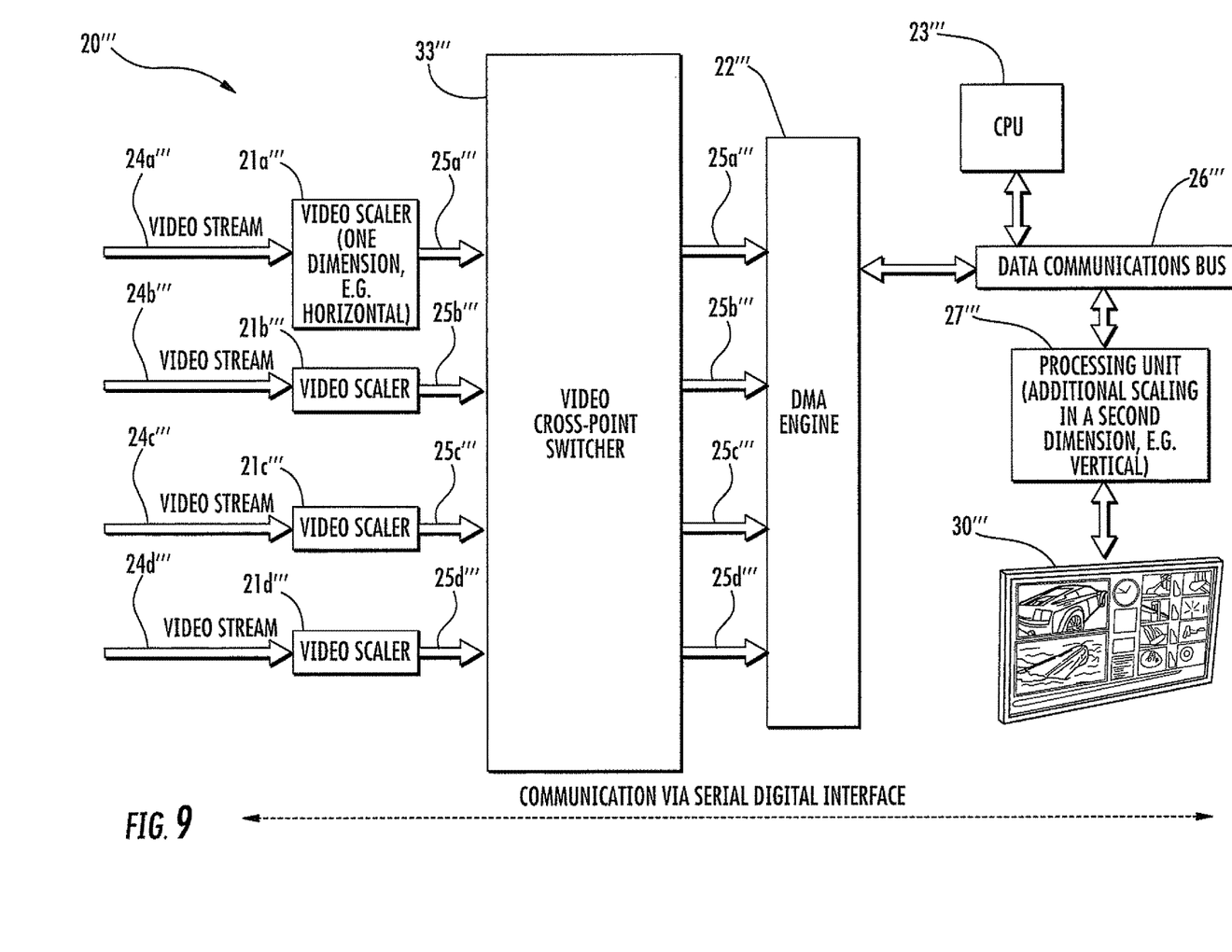
FIG. 9 is a schematic block diagram of a fourth embodiment of the video multiviewer system according to the present invention.

Referring now to FIG. 9, another embodiment of the video multiviewer system 20''' is now described. In this embodiment of the video multiviewer system 20''', those elements already discussed above with respect to FIG. 6 are given triple prime notation and most require no further discussion herein. This embodiment differs from the previous embodiment in that the video scalers 21a'''-21d''' and the processing unit 27''' illustratively communicate through the video cross-point switcher 33''' using a serial digital interface. Advantageously, the video scalers 21a'''-21d''' and the processing unit 27''' may communicate efficiently using the serial digital interface.

Additionally, each of the video scalers 21a'''-21d''' may perform video scaling based upon available bandwidth in the serial digital interface. In other words, if the video input streams 24a'''-24d''' include less metadata, for example, audio ballistics, then the video scalers 21a'''-21d''' may scale to a greater degree. The serial digital interface may be based upon the SMPTE 424M 3G-SDI standard, for example. Other serial data interfaces are also contemplated as will be appreciated by those skilled in the art.

Further, the serial digital interface may include a set packet size for the video scalers 21a'''-21d''' and the processing unit 27'''. The data communications bus 26''' may operate based upon the set packet size, thereby providing greater efficiency. In some embodiments, the video scalers 21a'''-21d''' and the processing unit 27''' may be geographically spaced apart because the SDI is readily communicated over available digital communications infrastructure.

Figure 10:
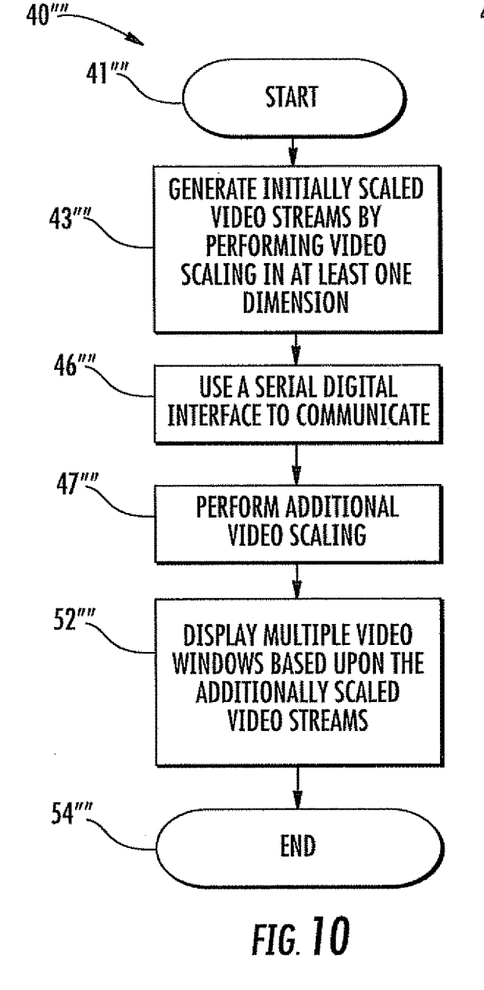
FIG. 10 is a flowchart for a fifth embodiment of the method of operating a video multiviewer system according to the present invention.
Figure 11:
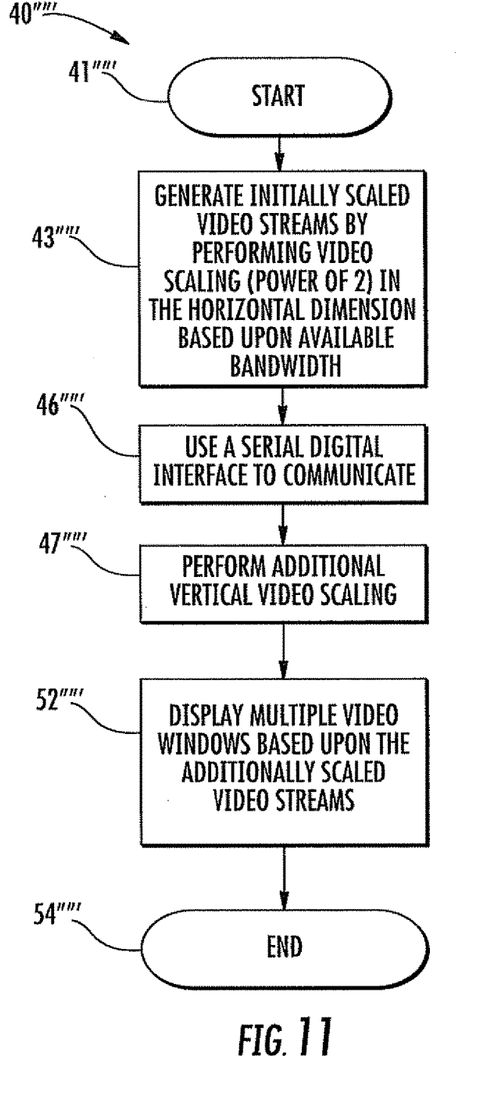
FIG. 11 is a flowchart for a sixth embodiment of the method of operating a video multiviewer system according to the present invention.

Referring now to FIG. 10, another embodiment of the method for operating a video multiviewer system 20''' is now described in flowchart 40''''. In this embodiment of the method, those elements already discussed above with respect to FIG. 4 are given quadruple prime notation and most require no further discussion herein. This embodiment differs from the previous embodiment in that the method further illustratively includes at Block 46'''' using a serial digital interface to communicate through the video cross-point switcher 33''' and between the video scalers 21a'''-21d''' and the processing unit Referring now to FIG. 11, yet another embodiment of the method for operating a video multiviewer system 20''' is now described in flowchart 40''''. In this embodiment of the method, those elements already discussed above with respect to FIG. 10 are given quintuple prime notation and most require no further discussion herein. This embodiment differs from the previous embodiment in that the method illustratively includes performing at least horizontal scaling, for example, scaling at a power of 2, at Block 43''''. Also, the method illustratively includes performing at least vertical scaling at Block 47''''.

Figure 12:
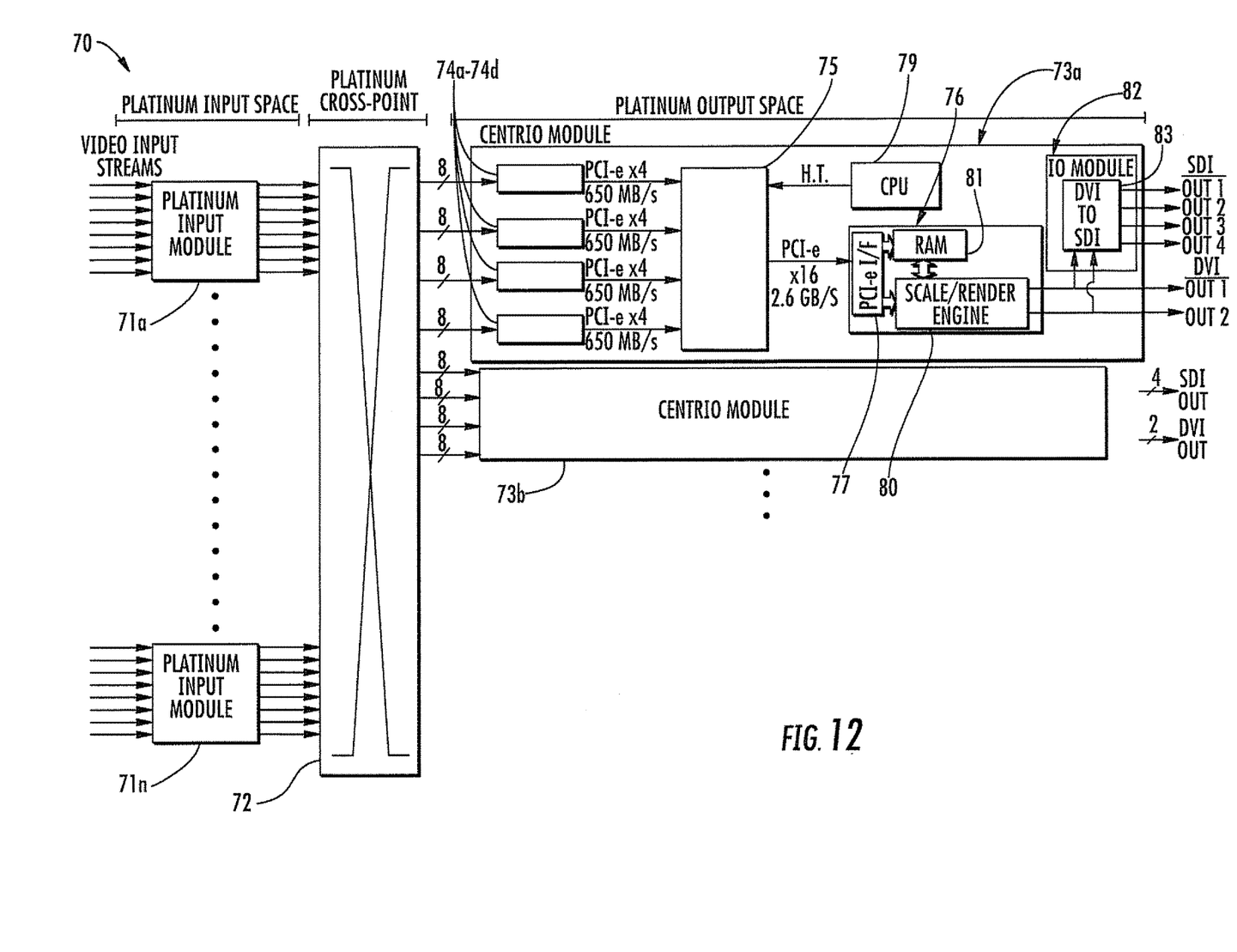
FIG. 12 is a more detailed schematic block diagram of another video multiviewer system according to the invention.

Referring to FIG. 12, as will be appreciated by those skilled in the art, an exemplary implementation of a video multiviewer system 70, similar to the multiviewer 20 as shown in FIG. 1, is now described. The video multiviewer system 70 illustratively includes a plurality of Platinum Input Modules (PIMs) 71a-71n, as will be available from the Harris Corp. Each PIM 71a-71n illustratively receives eight video input streams. The video multiviewer system 70 may include up to 64 PIMs, receiving a total of 512 video input streams. The output of the PIMs 71a-71n is fed into a Platinum cross-point switcher 72, as will be available from the Harris Corp. The Platinum cross-point switcher 72 is fed into a plurality of Centrio modules 73a-73b, as will be available from the Harris Corp. Although illustrated with 2 Centrio modules 73a-73b, the video multiviewer system 70 may further include a total of 16 Centrio modules.

Each Centrio module 73a-72b illustratively includes a plurality of video input modules 74a-74d feeding into a local data bus 75 cooperating with a CPU 79, and a GPU 76. The local data bus 75 may comprise, for example, a PCI Express (1st generation) data bus or a Hyper Transport data bus. The GPU 76 illustratively includes a data bus 77, a Random Access Memory module 81 cooperating with the data bus, and a scaler/rendering engine 80 cooperating with the data bus. The GPU 76 outputs to the input-output module 82 including a Digital Visual Interface (DVI) to SDI converter 83.

Figure 13:
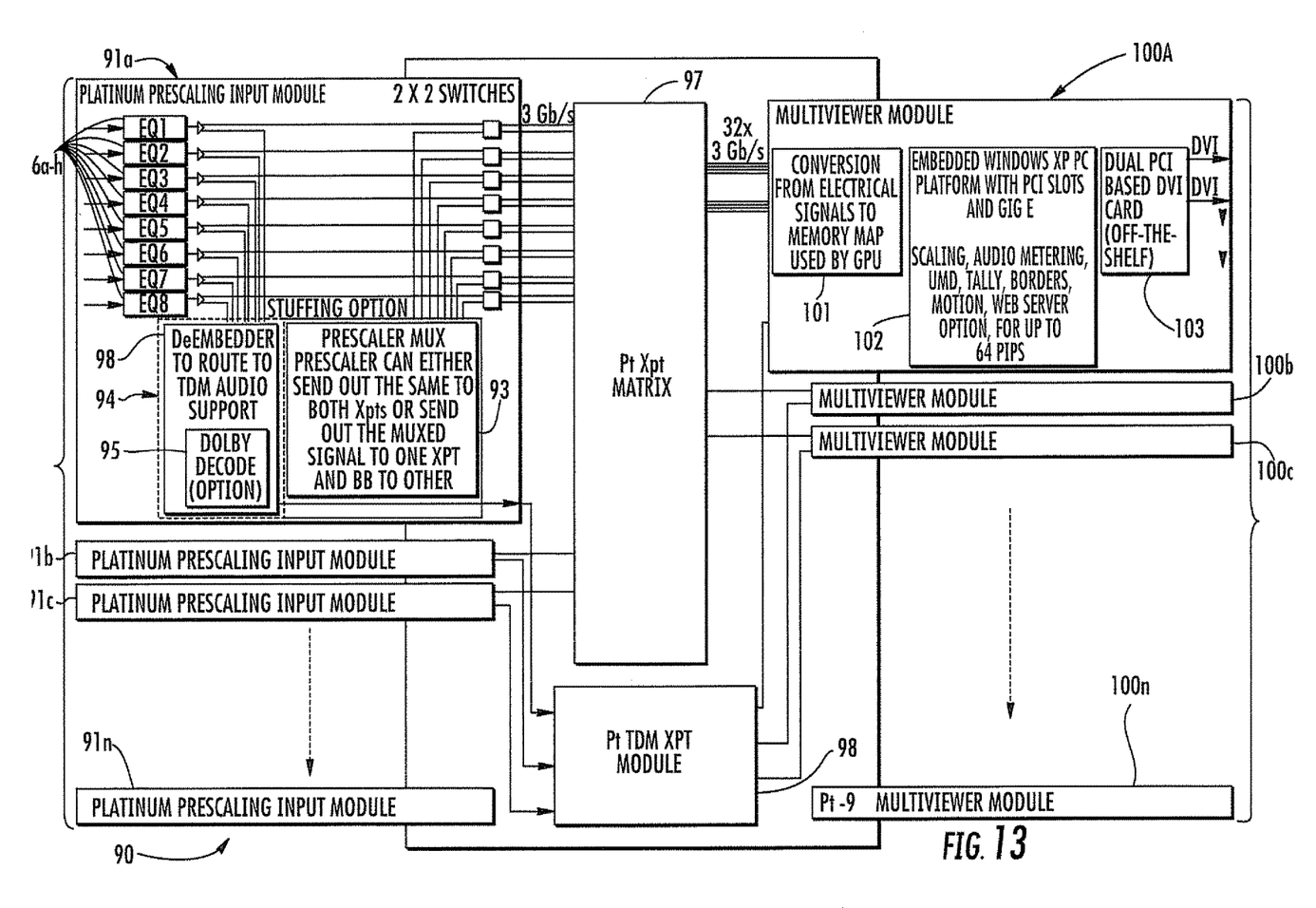
FIG. 13 is a more detailed schematic block diagram of yet another video multiviewer system according to the invention.

Referring to FIG. 13, as will be appreciated by those skilled in the art, an exemplary implementation of the video multiviewer system 90, similar to the system 20'' (FIG. 6), is now described. The video multiviewer system 90 illustratively includes a plurality of Platinum Prescaling Input Modules (PPIMs) 91a-91n, as will be available from the Harris Corp. Each PPIM 91a-91n illustratively receives eight video input streams.

Each PPIM 91a-91n illustratively includes respective equalizers 96a-96h for each video input stream, and a prescaler module 94 including a deembedder 98 cooperating with a prescaler multiplexer 93. The deembedder 98 also includes an optional Dolby decoder 95. The outputs of the PPIMs 91a-91n are illustratively received by the Platinum cross-point matrix 97 and a Platinum TDM cross-point module 98, both as will be available from the Harris Corp. The outputs of the Platinum cross-point matrix 97 and the Platinum TDM cross-point module 98 are received by a plurality of multiviewer modules 100a-100n. Each multiviewer module 100a-100n illustratively includes a converter 101, a scaler module 102 receiving the output of the converter, and a DVI card 103 receiving the output of the scaler module. The DVI card 103 including at least one GPU.

The communication link between the PPIMs 91a-91n and the multiviewer modules 100a-100n may have a payload bandwidth divided into 8 equal parts, each allocated to one of the 8 video input streams (channels) on a given PPIM. After reserving space for a given channel's pre-processed ancillary space and audio ballistics information, the remaining bandwidth may be allocated for the video stream. The video pre-scaling ratio may be hardcoded on a per-video standard basis, and stored in a table for hardware automatic lookup. The pre-scaling ratio may be selected to result in the highest bandwidth that fits in the allocated payload bandwidth.

The pre-processing parameters may be hardcoded at design or system integration phase and may not be dynamically changed. The packet size in the communications link may match the packet size used by multiviewer modules' 100a-100n local bus and DMA engine, thus minimizing logic required to handle the pre-processed data.

Advantageously, the communications links in the video multiviewer system 90 follow the same profile. Any communication link may be used by the multiviewer modules 100a-100n without these modules interfering with each others operation. A single communication link may carry all 8 channels from a given input module, i.e. a multiviewer module 100a-100n may have full simultaneous access to up to 32 PPIMs 91a-91n, permitting greater access.

Figure 14:
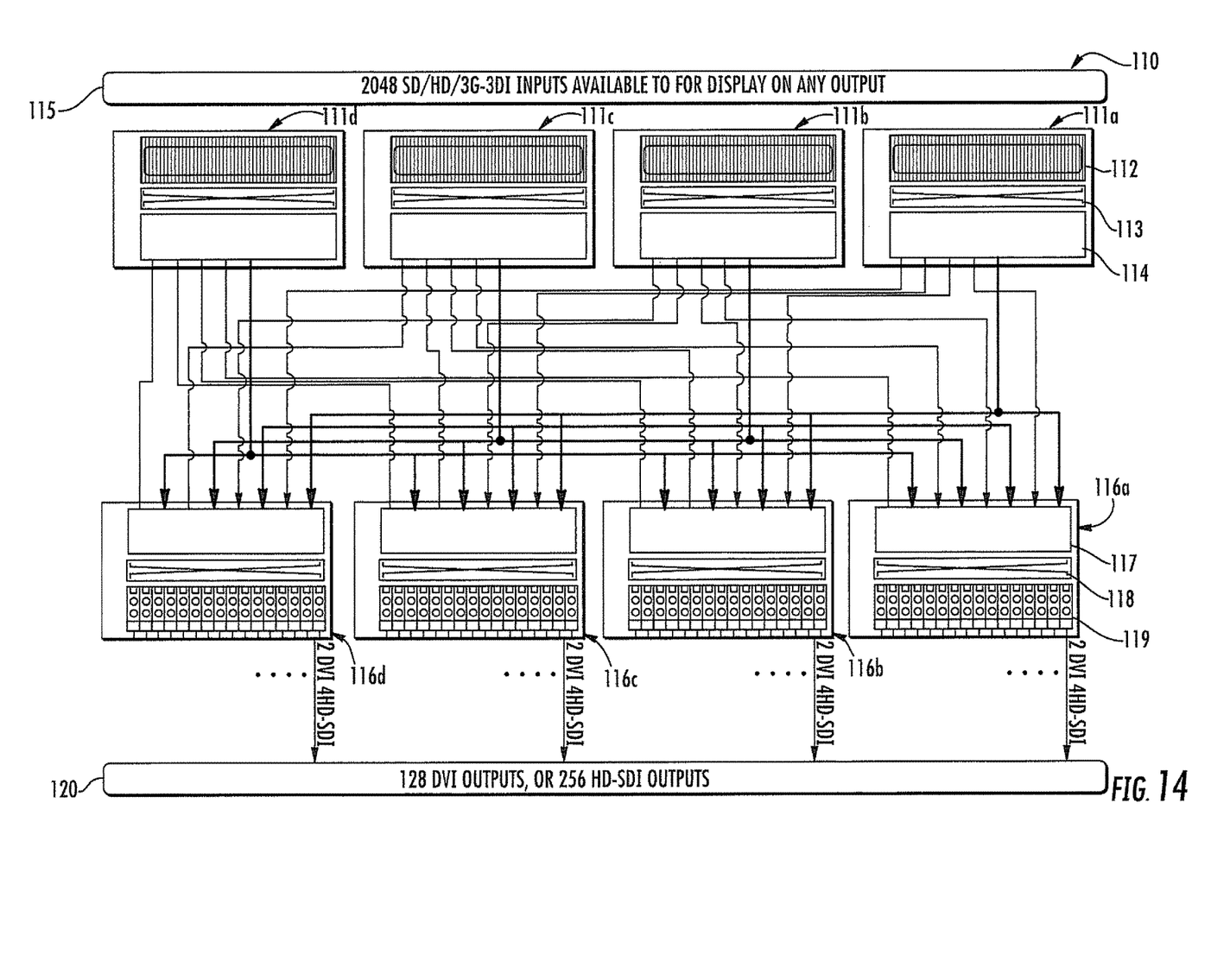
FIG. 14 is yet another more detailed schematic block diagram of the video multiviewer system according to the present invention.

Referring now to FIG. 14, as will be appreciated by those skilled in the art, another exemplary implementation of the video multiviewer system 20 (FIG. 1), is now described. This video multiviewer system 110 illustratively includes a plurality of first 28RU Platinum router frames 111a-111d, as will be available from the Harris Corp, each including a plurality of inputs 112, a cross-point switcher 113 coupled thereto, and a plurality of outputs 114 upstream of the cross-point switcher.

The outputs 114 are received by a plurality of second 28RU Platinum router frames 116a-116d, each also including a plurality of inputs 117, a cross-point switcher 118 coupled thereto, and a plurality of outputs 119 upstream of the cross-point switcher. The video multiviewer system 110 illustratively receives 2048 SD/GD/3G-SDI video input streams and outputs 128 DVI outputs, or alternatively 256 HD-SDI outputs. As will be appreciated by those skilled in the art, the video multiviewer system 110 may be scaled to have more or less inputs and outputs.

Other features and advantages are disclosed in co-pending applications entitled VIDEO MULTIVIEWER SYSTEM WITH SWITCHER AND DISTRIBUTED SCALING AND RELATED METHODS and VIDEO MULTIVIEWER SYSTEM WITH SERIAL DIGITAL INTERFACE AND RELATED METHODS having attorney work docket numbers 64020 and 64022; and the entire contents of which are incorporated herein by reference. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A video multiviewer system comprising:
a plurality of video scalers operating in parallel to:
perform a portion of a distributed video scaling process on a plurality of video input streams from a given size to another size to generate initially scaled video streams by performing video scaling in at least one dimension on the plurality of video input streams based upon an initial scaling ratio and based upon an amount of metadata associated with the plurality of video input streams; and
the processing unit coupled downstream from the plurality of video scalers to:
perform a remaining portion of the distributed video scaling process on the initially scaled streams to complete the distributed video scaling process from the given size to the other size to generate a plurality of scaled video output streams, the remaining portion of the distributed video scaling process being performed on the initially scaled video streams based upon the initial scaling ratio, wherein the processing unit and the plurality of video scalers each share a respective portion of computational workload for the video scaling the plurality of video input streams from the given size to another size; and a display cooperating with the processing unit for displaying multiple video windows based upon the plurality of scaled video output streams.

2. The video multiviewer system according to claim 1 wherein each of the plurality of video scalers performs video scaling in only one dimension.

3. The video multiviewer system according to claim 1 wherein each of the plurality of video scalers performs video scaling in at least a horizontal dimension of video frames.

4. The video multiviewer system according to claim 1 wherein the processing unit performs video scaling in at least a vertical dimension of video frames.

5. The video multiviewer system according to claim 1 wherein each of the plurality of video scalers performs video scaling as a selectable power of 2.

6. The video multiviewer system according to claim 1 wherein the processing unit comprises a Graphics Processing Unit (GPU) including a GPU processor and GPU memory coupled thereto.

7. The video multiviewer system according to claim 6 further comprising at least one Direct Memory Access (DMA) engine coupled between the plurality of video scalers and the GPU.

8. The video multiviewer system according to claim 7 further comprising a data communications bus coupled between the at least one DMA engine and the GPU, and a central processing unit (CPU) coupled the data communications bus.

9. The video multiviewer system according to claim 1 wherein each of the plurality of video scalers comprises a hardware implemented video scaler.

10. The video multiviewer system according to claim 1 further comprising at least one video cross-point switcher coupled upstream from the plurality of video scalers.

11. The video multiviewer system according to claim 1 wherein the plurality of video scalers and the processing unit further cooperate to process data other than video stream data.

12. The video multiviewer system according to claim 11 wherein the plurality of video scalers performs bit data extraction; and wherein the processing unit performs data decoding and interpretation based upon the bit data extraction.

13. A video multiviewer comprising:
a plurality of video scalers operating in parallel to:
perform a portion of a distributed video scaling process on a plurality of video input streams from a given size to another size to generate initially scaled video streams by performing at least horizontal video scaling on the plurality of video input streams based upon an initial scaling ratio and based upon an amount of metadata associated with the plurality of video input streams; and
the processing unit coupled downstream from said plurality of video scalers to:
perform a remaining portion of the distributed video scaling process on the initially scaled streams to complete the distributed video scaling process from the given size to the other size to generate a plurality of scaled video output streams, the remaining portion of the distributed video scaling process being performed on the initially scaled video streams based upon the initial scaling ratio, wherein the processing unit and the plurality of video scalers are operate in concert to share a workload of video scaling the plurality of video input streams from the given size to another size.

14. The video multiviewer system according to claim 13 further comprising a display cooperating with the processing unit for displaying multiple video windows based upon the plurality of scaled video output streams.

15. The video multiviewer system according to claim 13 wherein each of the plurality of video scalers performs video scaling in only one dimension.

16. The video multiviewer system according to claim 13 wherein each of the plurality of video scalers performs horizontal video scaling as a selectable power of 2.

17. The video multiviewer system according to claim 13 wherein the processing unit comprises a Graphics Processing Unit (GPU) including a GPU processor and GPU memory coupled thereto.

18. The video multiviewer system according to claim 17 further comprising at least one Direct Memory Access (DMA) engine coupled between the plurality of video scalers and the GPU.

19. The video multiviewer system according to claim 17 further comprising a data communications bus coupled between the at least one DMA engine and the GPU, and a central processing unit (CPU) coupled to the data communications bus.

20. The video multiviewer system according to claim 13 wherein the plurality of video scalers and the processing unit further cooperate to process data other than video stream data.

21. A method for operating a video multiviewer system comprising a plurality of video scalers, a processing unit coupled downstream from the plurality of video scalers, and a display cooperating with the processing unit, the method comprising:
operating the plurality of video scalers in parallel to:
perform a portion of a distributed video scaling process on a plurality of video input streams from a given size to another size to generate initially scaled video streams by performing video scaling in at least one dimension on the plurality of video input streams based upon an initial scaling ratio and based upon an amount of metadata associated with the plurality of video input streams;
operating the processing unit to:
perform a remaining portion of the distributed video scaling process on the initially scaled video streams to complete the distributed video scaling process from the given size to the other size to generate a plurality of scaled video output streams, the remaining portion of the distributed video scaling process being performed on the initially scaled video streams based upon the initial scaling ratio, wherein the processing unit and the plurality of video scalers operate in concert to share a computational workload of video scaling the plurality of video input streams from the given size to another size; and
displaying multiple video windows based upon the plurality scaled video output streams.

22. The method according to claim 21 wherein the plurality of video scalers are operated to perform-video scaling in only one dimension.

23. The method according to claim 21 wherein the plurality of video scalers are operated to perform-video scaling in at least a horizontal dimension of video frames.

24. The method according to claim 21 wherein the processing unit is operated to perform video scaling in at least a vertical dimension of video frames.

25. The method according to claim 21 wherein the plurality of video scalers are operated to perform video scaling as a selectable power of 2.

26. The method according to claim 21 further comprising operating the plurality of video scalers and the processing unit to cooperate for processing data other than video stream data.

27. The method according to claim 26 further comprising performing bit data extraction with the plurality of video scalers; and performing with the processing unit data decoding and interpretation based upon the bit data extraction.

* * * * *